United States Patent [19]

Bartlett et al.

[11] 3,761,882

[45] Sept. 25, 1973

[54] PROCESS CONTROL COMPUTER

[75] Inventors: Peter G. Bartlett; Donald E. Henry, both of Davenport, Iowa; Thomas Murrell, Urbana, Ill.

[73] Assignee: Struthers-Dunn, Inc., Pitman, N.J.

[22] Filed: Dec. 1, 1971

[21] Appl. No.: 203,570

[52] U.S. Cl. .............................................. 340/172.5

[51] Int. Cl. ............................................... G06f 3/06

[58] Field of Search.................. 340/172.5; 235/157

[56] References Cited

UNITED STATES PATENTS

| | | | |
|---|---|---|---|
| 3,517,171 | 6/1970 | Avizienis | 340/172.5 |
| 3,465,298 | 9/1969 | La Duke et al. | 340/172.5 |
| 3,247,498 | 4/1966 | Sadvary et al. | 340/172.5 |
| 3,377,623 | 4/1968 | Reut et al. | 340/172.5 |
| 3,400,374 | 9/1968 | Schumann | 340/172.5 |
| 3,477,063 | 11/1969 | Anderson et al. | 340/172.5 |
| 3,210,733 | 10/1965 | Terzian et al. | 340/172.5 |

*Primary Examiner*—Paul J. Henon
*Assistant Examiner*—Mark Edward Nusbaum
*Attorney*—William D. Hall et al.

[57] ABSTRACT

A solid state process control computer for continually controlling a plurality of outputs in dependence upon the conditions of a plurality of continually variable input parameters. The controller includes a memory capable of storing a large number of multi-bit words each comprising both an address and an instruction. The memory is scanned on a word-by-word basis at high speed. A central processing means is provided and a data input/output bus is connected both to the input and the output of the central processing means. As each word in the memory is scanned, the instruction portion of each scanned word selectively either enables the central processing means to receive data from input/output bus or it enables the input/output bus to receive data from the central processing means. The address portion of each scanned word in the memory operatively connects any one of a plurality of registers to the input/output bus. A register may either be connected so as to be responsive to an input parameter or it may be connected so as to control an output device. The memory comprises a matrix having a large plurality of intersections each including a fused diode. The placing of a word in the memory is accomplished by selectively open circuiting one or more of the fused diodes corresponding respectively to the different bits of each word in the memory.

10 Claims, 6 Drawing Figures

FIG. 1.
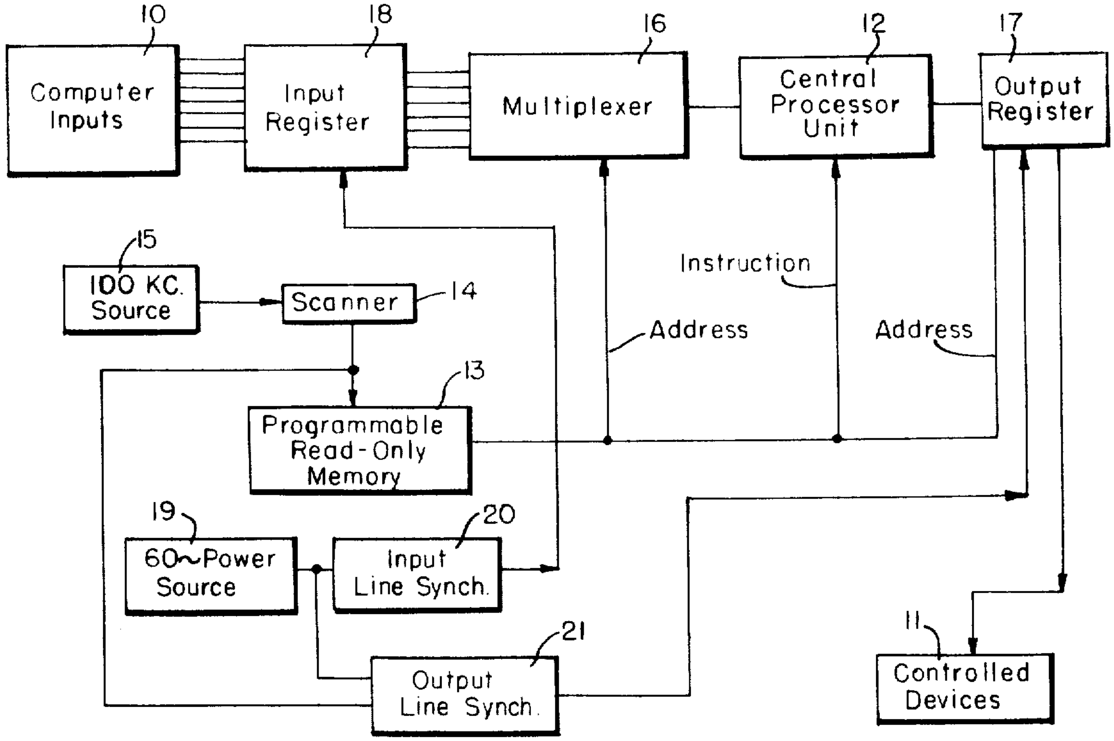
FIG. 4.
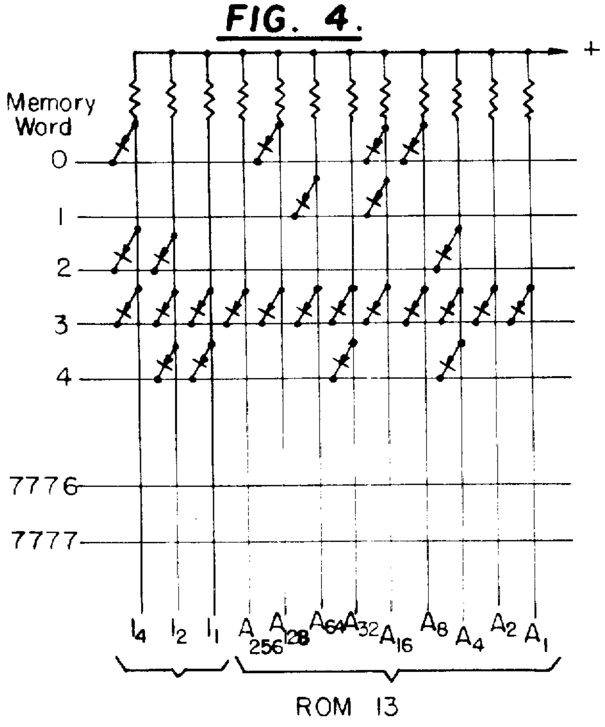
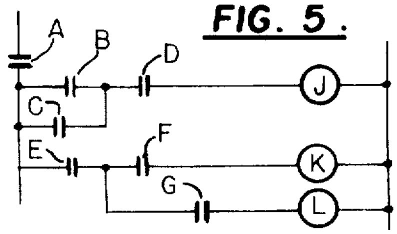
FIG. 5.
FIG. 6.
Controller Program
| English | | Code Form | |
|---|---|---|---|
| 1. LDA | A | 100 | A |
| 2. AUX | 510 | 111 | 111111110 |
| 3. LDA | B | 100 | B |
| 4. OR | C | 010 | C |
| 5. AND | D | 000 | D |
| 6. STO | J | 110 | J |
| 7. LDA | E | 100 | E |
| 10. AND | M | 000 | M |
| 11. STO | K | 110 | K |
| 12. LDA | E | 100 | E |
| 13. AND | F | 000 | F |
| 14. STO | K | 110 | K |
| 15. LDA | E | 100 | E |
| 16. AND | G | 000 | G |
| 17. STO | L | 110 | L |

PROCESS CONTROL COMPUTER

BACKGROUND OF THE INVENTION

In the past, the logic functions of process control apparatus have been performed with electromagnetic relays. A symbology has been developed for illustrating relays and their contacts, and the predetermined interconnection of such contacts in order to perform a predetermined control logic.

The use of relays in process control systems has never, however, presented an ideal solution. For one thing, the relay is a mechanical device and thus has a limited life. Relays are quite expensive, their contacts may become corroded and dirty so that less than ideal circuit connections are provided thereby, and it is also common for the contacts to bounce upon closure so that a solid circuit connection is not provided. Also, with relay systems, the wiring of the circuitry is an expensive, time-consuming process, and any changes in the relay logic can usually only be made with difficulty.

With relay circuitry, it may be difficult at a later date to determine the control logic for which the circuitry has been devised, and this is particularly the situation where changes are made from time to time in the original circuit without in every instance making a corresponding change in the related circuit drawing.

With relay control systems, the obsolescence of the system is built-in. Thus, once the relays and their various contacts are wired according to a pre-arranged pattern, the control logic of the system which is stored in its memory is fixed and cannot readily be altered when it is desired to vary the process in some way or another. Such a change can ordinarily be effected only by changing the system's "memory" which may involve removing the wiring and relays and completely redesigning the entire system. The expense which is attendant with such a redesign is such that many users find it more economical to construct an entirely new system and discard the old.

Solid state logic control systems have been developed in which solid state components replace the relays. Such systems have improved reliability over the relay systems, but they still have the disadvantage that the control logic of the system is fixed once the various solid state logic components are wired together in a predetermined manner as required by the functions to be performed.

In some instances, modern, high-speed digital computers are used in process control systems. Such systems of course do offer high speed of operation and generally high reliability, but have the disadvantage that custom-designed input and output interface equipment is often required and that high levels of skill are required in the operation, programming, and maintenance of the computers. A further disadvantage is that such computers often require a special type of environment which can of course present a problem since many process control systems are operated under highly adverse conditions of temperature, humidity, and corrosive atmospheres.

Finally, there has been developed in the prior art various types of programmable controllers of which the controller of this invention is a representative embodiment. Such programmable controllers provide all the control functions that can be provided by both relays and solid state logic systems and have the capability of controlling simultaneously a plurality of outputs in accordance with the conditions of a plurality of continuously variable input parameters. Generally, such systems operate by repeatedly scanning all of the input parameters, one at a time, and computing the required conditions of the output devices in dependence upon the then-existing states of the input parameters. The operating sequence of the apparatus is stored in a memory, and the information stored in the memory determines the computation functions that are to be carried out on each computing step with respect to the input parameters and determine also the routing of the outputs from the computing apparatus to the output devices.

Some of the presently available programmable controllers provide that changes can be made in the memory so that the system may be reprogrammed for a new application, with the result that the built-in obsolescence of relays control systems is thereby overcome. The new systems are of course much more compact than the equivalent relay control systems and are of modular construction so that they can very readily be expanded in size in accordance with any particular application.

Despite the fact that programmable controllers of the type generally described above do provide significant advantages over the prior art systems, the systems of which we are aware still provide several significant drawbacks. One of the drawbacks present in some of the presently available process control computers is that a predetermined number of input and output registers are provided (often an equal number of each) and it is thus difficult to accommodate such a system to a specific situation where, for example, a large number of input registers is required but only a small number of output registers is needed.

Another disadvantage of the process control computers of the prior art is that they frequently employ a circuit arrangement which provides what may be termed "floating" outputs. In other words, the various output devices are at any time capable of being operated to a condition determined by the then-generated output of the central processor unit. Thus, as the various input parameters continually change, and as new outputs are determined by the central processor, the various output devices may have their controlled conditions altered at any time that a new control is computed for that device. The disadvantage of such an arrangement is that the various registers associated with the output devices can then not be made available for temporary storage of any computed data but must at all times be exclusively used for control of the associated output device.

A further disadvantage of the prior art process control computers resides in the difficulty occurring when a process control system has a master switch or master relay. Such a device may frequently be used to restore all control devices to a predetermined condition upon the occurrence of an emergency situation. From the standpoint of circuit configuration, the function of a master switch or a master relay is intended to be effective in each of a large number of branch circuits, and in the past this has ordinarily meant that in the computation of the circuit conditions for each such branch circuit, it is necessary to take into account the condition of the master control which means in effect that its condition must be taken into account in computing each branch circuit. The result is that an appreciable portion of the computing and memory storage capacity of the controller must be set aside for these repetitive computations.

Other process control computers of the prior art employ a read-only memory which stores the predetermined program. In all the other systems of which we are aware, however, the memory is either of the type which cannot be altered so as to change the program, with the result that the only alternative then is to provide a completely new memory for the system, or else changes to the program can be made only with considerable difficulty and often only with the purchase of quite expensive equipment. This is particularly true with those memories which use magnetic cores since the stored memory can with such equipment ordinarily be changed only by the use of quite complicated and expensive apparatus.

Solid state process control computers employ solid state devices which are very susceptible to inadvertent operation in response to electrical noise. Systems of this type quite frequently operate in conditions where there are high ambient levels of electrical noise which seriously aggravates this problem. Also, in many of the prior art systems of this type, adequate steps have not been taken to provide a high degree of noise immunity so that erratic operation can at times occur.

SUMMARY OF THE INVENTION

With the controller of this invention, it is possible to vary the "mix" of input and output registers widely. Thus, it is possible to have, for example, only a few registers designated as input registers, with all the remainder of the system's register capacity comprising output registers, or vice versa.

A further advantage of the controller of this invention over those heretofore known is its provision of an auxiliary gate which for convenience will hereinafter be referred to as the "X-gate". The so-called X-gate is of particular utility where it is desired that there be ANDed with a plurality of computed functions a particular signal which is representative of one of the input parameters. A practical application of this technique occurs frequently in process control systems where a master switch function is to be included in a large-number separately-computed function. In other programmable controllers of the prior art, it is generally necesary to incorporate in many of the computational steps the condition of the master switch function, and this may occur so frequently that a substantial part of the memory is allocated to this function. In the controller of this invention, on the other hand, the state of the master switch may be stored in the X-gate for any desired part of the program, and the output of this X-gate is then ANDed with all other computed outputs of the central processor so that an effective control is provided by the central processor on each computational step only under those circumstances where the X-gate stores a datum representing that the master switch is closed. This expedient makes it possible to use the capacity of the memory for more meaningful operations.

Another significant feature of the apparatus of this invention is its use of a memory which can very readily have its program added to or revised in the field without requiring that expensive, complicated, and hard-to-use memory-writing apparatus be employed. With the controller of this invention, the memory comprises a matrix comprising a plurality of memory words each represented by a plurality of bits. Each bit is represented in the matrix by the selective interconnection of two conductors. Each selective interconnection of such conductors is effected by a fused diode, and in the normal unprogrammed state, the diode connection is effective between the two conductors. In placing a program in the memory, selected ones of the fused diodes for the different bits of each word are open-circuited as by passing a current through the diode of such magnitude that the associated fuse is blown. As will hereinafter be described, such a memory can readily be altered in the field, and it is also readily possible for the program to be expanded at will by utilizing previously unused memory words.

A still further significant feature of this invention over the prior art is its synchronization of operation with the power line. Thus, the conditions of the continuously variable input parameters are always scanned and their conditions transferred to input registers at the instant when the waveform of the power source is at maximum amplitude. This has the advantage of ensuring that maximum voltage is available to drive the input registers, thereby making possible a significant increase in the immunity of the entire system to random noise. Thus, it will be readily appreciated by those skilled in the art that noise signals are an ever-present problem in dealing with process control systems. Systems of this type generally operate in environments of high electrical noise and yet employ many solid state devices which are designed to operate on extremely low signal levels. It is thus readily possible for such solid state devices to be inadvertently operated by noise signals. The transferring of the inputs representative of the input parameters to the input registers at a time of maximum amplitude of the power line source makes possible a very significant increase in noise immunity for the system.

A similar noise problem is presented in connection with the control of the output devices. In the prior art systems, where output devices are switched on and off at will, without in any way being synchronized to the power line source, the noise problems are made more acute by the fact that various devices may be switched on and off at a time when the power line source is at or near its maximum value. At such times, the current levels through the control devices may also be at high levels and consequently the onset and termination of such currents tends to produce considerable quantities of electrical noise which may affect other parts of the system. According to the present invention, the computed conditions on each scan of the apparatus for the various output devices are not transferred to the output devices until such time as a complete scanning cycle has been completed and, thereafter, the waveform of the power source passes through zero voltage.

A further feature of this invention is that all of the computed outputs, as they are computed one by one on each scanning cycle, are held in temporary storage registers until the entire scanning cycle has been completed. More specifically, the various registers which are selected as output registers by the memory and to which the putputs of the central processor are applied all retain such computed outputs until the end of the complete scanning cycle. Such registers may be termed as temporary storage registers and each has associated therewith a holding register whose condition at all times directly controls a respective one of the output or controlled devices. A holding register receives an input from its associated temporary storage register but still cannot follow the condition of that temporary storage register until it receives a synchronizing signal which comes only at the completion of a complete memory scan. When such synch signal is received, each holding register then assumes the "0" or "1" state dependent upon the condition that its associated temporary storage register had at the instant of occurrence of the write signal. This arrangement provides greatly increased flexibility for the computing apparatus of this invention. Thus, it makes possible the use of registers which have thus far in a complete scanning cycle not yet been loaded with a finally computed output for temporary storage of data comprising the result of an interim computing operation. Any number of such unused registers may thus be used for interim holding of data since the temporary operation of the register in response to something other than a final output is not in any event going to affect any of the control devices. A further advantage of this arrangement is that it makes possible the correction of errors in programming of the memory. Thus, if it is assumed that a particular word of the memory is incorrectly placed in storage, it is readily possible to ignore such incorrectly written word and merely rewrite it correctly as a subsequent word in the program. The incorrectly written memory word will produce an erroneous output from the central processor but will of course not effect the actual operation of an output device because the write signal will not be generated until the end of a complete scan. The subsequent correct recomputation of the erroneous memory word will then correctly operate the appropriate temporary storage register; at the end of the scanning cycle, the appropriate holding register is operated in response to the occurrence of the write signal and the appropriate controlled device is then operated in the intended manner.

BRIEF DESCRIPTION OF THE DRAWINGS

In describing this invention, reference will be made to the accompanying drawings in which:

FIG. 1 is a general block diagram of the controller of this invention;

FIG. 4 illustrates diagrammatically a portion of the read-only memory of the invention;

FIG. 5 illustrates some of the typical process control computations which may be made by the controller of the invention; and FIG. 6 illustrates a typical program for the computer of the invention which program is particularly related to the problem of FIG. 5.

DETAILED DESCRIPTION OF THE PREFERRED EMBODIMENT

Figure 2:
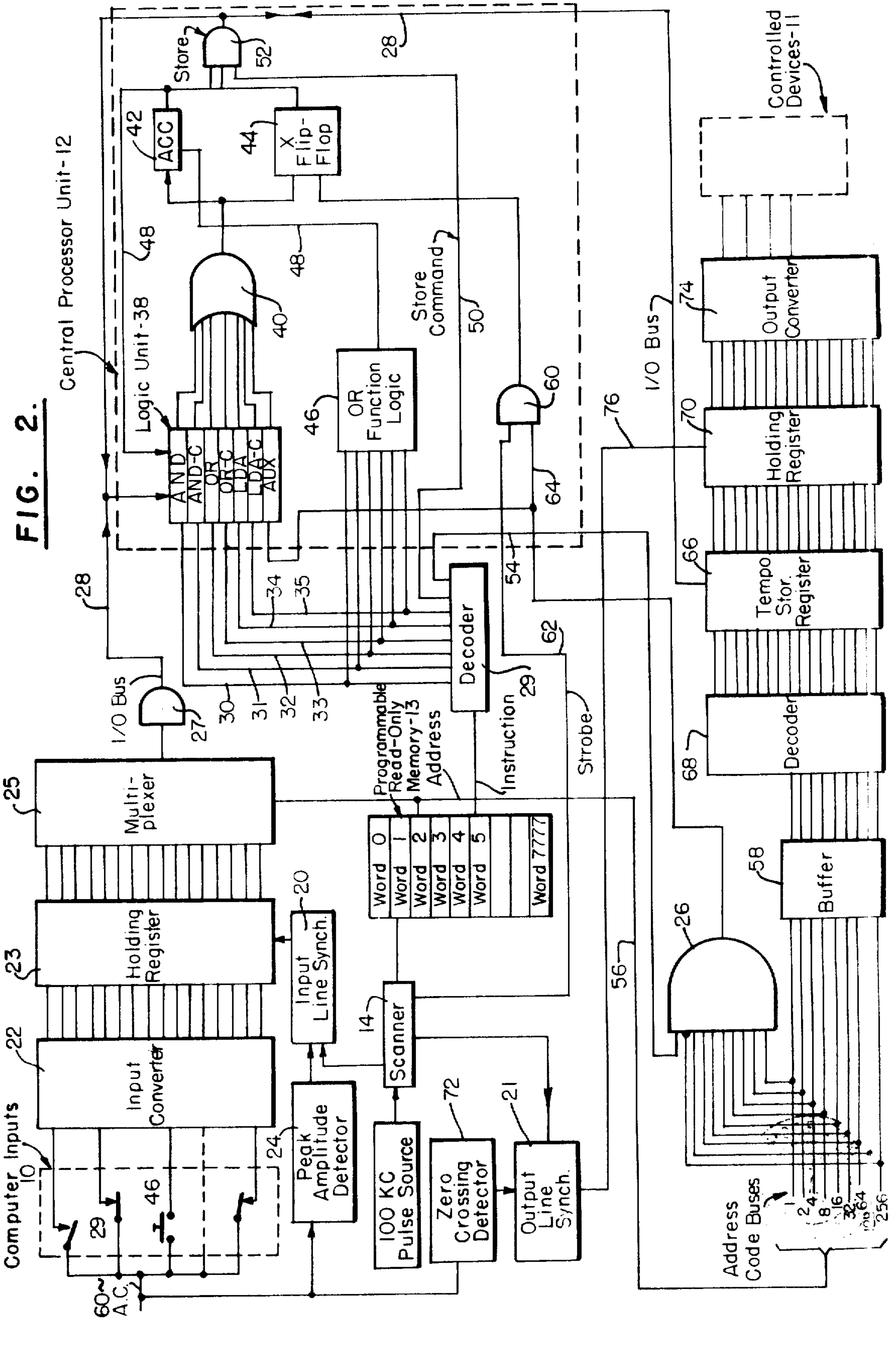
FIG. 2 is a more detailed block diagram of the invention.

A general block diagram of the controller of this invention is shown in FIG. 1. The controller of the invention is interfaced between Computer Inputs 10 which represents the continuously variable input parameters to which the controller responds, and Controlled Devices 11 which represents the various outputs that are controlled in accordance with the computations made by the computer.

The heart of the apparatus comprises the Central Processor Unit 12 which includes apparatus for performing three basic computational operations. Thus, the CPU includes an AND capability, and OR capability, and a NOT capability. This is the equivalent of having one set of series-connected relay contacts, one set of parallel-connected relay contacts, and a normally closed contact. The processor shares this one group of elements, using only one as each word is read from the memory, to make all of the decisions required for the control system. One decision is made at a time utilizing the three basic logic elements. The controller operates on a step-by-step basis, on each step performing a discrete function which may involve any one of the following: (a) operatively connecting the CPU 12 to a particular one of the Computer Inputs 10; (b) performing a particular one of the three logic functions referred to above with two different information bits, one being a bit then stored in an Accumulator forming a part of the CPU 12 and the other being a bit stored in either an input register or an output register; and (c) transferring the data then stored in the Accumulator of the CPU to an output register.

The selection of which function to perform on any given processing step is determined by a Programmable Read-Only Memory 13 which is driven by a Scanner 14 that is in turn driven by a 100 Kc. Source 15. The Read-Only-Memory (ROM) 13 stores a plurality of words each comprising both an address portion and an instruction portion. The instruction portion of each word is applied to the CPU 12 and selects the particular logic function which is to take place at any given time. The address portion of each word in the memory is applied both to a Multiplexer 16 and to an Output Register 17. This address portion of each word is used to determine which of the various Computer Inputs 10 is to be applied to the CPU 12 or which of the various individual registers in the Output Register 17 is to have transferred to it the data bit then held in the CPU.

The ROM 13 is scanned one word at a time by Scanner 14 which, in effect, comprises a ring counter driven at the 100 Kc. rate established by Source 15. Consequently, the ROM 13 advances from one word to the next repeatedly each 10 microseconds so that a new instruction is provided each 10 microseconds to the CPU 12. It will thus be apparent that a great many words can be stored in the Memory 13 and a correspondingly great number of computations can be carried out by the CPU 12 in only a few milliseconds, with the result that the conditions of the controlled devices accurately reflect the conditions of the input parameters determined by Computer Inputs 10.

On a typical cycle, all of the inputs represented by Computer Inputs 10 are gated into an Input Register 18 and stored in that Register 18. Such gating of the inputs to Register 18 is timed to occur at the time that the 60-cycle power source is at its maximum amplitude. Thus, the 60-cycle Power Source 19 controls apparatus which is termed the Input Line Synch 20 of FIG. 1, and the latter apparatus provides an input pulse to Input Register 18 upon each occurrence of maximum amplitude of the power source so that the Input Register 18 receives an enabling input at the rate of 120 pulses per second. The manner in which this pulse is provided has been effected with a "line synchronized trigger circuit" such as that shown on page 29 of the General Electric "Transistor Manual", copyright 1964. Since the power source frequency is a predetermined constant and the period of time elapsed between the zero crossing and the point of maximum voltage is known, the signal produced by the line synchronized trigger circuit is then delayed by the necessary period of time by a monostable multivibrator such as that shown on page 201 of the same manual. A further monstable multivibrator is then used to generate the pulse which is directed to the input register 18.

The 60-Cycle Power Source 19 also controls operation of the Output Line Synch 21 which provides an output to the Output Register 17. The Output Line Synch is controlled to provide such enabling pulse to the Output Register 17 upon each occurence of the zero crossing point of the cycle power source thereby enabling the Output Register 17 to respond to all the computations made during the just-completed scan and control the various Controlled Devices 11 in accordance with those computations.

Referring now to FIG. 2 which shows the process controller invention in block form but in greater detail than FIG. 1, it will be seen that the Computer Inputs 10 are represented by a plurality of contacts which may comprise normally open contacts, normally closed contacts, pushbuttons, etc. These are shown as receiving energy from a 60-cycle a.c. power source as this is what is most often encountered in actual practice.

The Computer Inputs 10 provide a plurality of inputs to an Input Converter 22, which may be of the type disclosed in U. S. Pat. No. 3,626,203, whose effect is to transform the inputs from high-level signals to low-level signals in the order of perhaps twelve volts d.c. Thus, each input of the Input Converter may selectively receive a 60-cycle 110 or 120 volt signal, and dependent upon whether or not it does receive such input, it will selectively produce at its output a 12 volt d.c. signal or no signal. It will further be understood that the various stages of the Input Converter, each corresponding to a respective input, at all times continuously follow the changing conditions of the inputs so that each stage of the Input Converter 22 is at each instant controlled in accordance with the condition of its associated input parameter.

The Holding Register 23 comprises a separate stage for each stage of the Input Converter, and each stage of the Holding Register may comprise a flip-flop which is operable to either of its two bistable stages dependent upon the condition of the associated stage of the Input Converter. The various stages of the Holding Register, however, are not free to follow at each instant the operative condition of the associated stage of the Input Converter. Instead, the Holding Register is provided with an enabling input from the Input Line Synch 20 at the beginning of each complete scan of the Programmable Read-Only Memory (ROM) 13. The Input Line Synch 20 is controlled to provide its enabling input to Holding Register 23 at the instant of peak amplitude of the 60-cycle power source. Thus, the Input Line Synch 20 of FIG. 2 is shown as receiving one enabling input from Scanner 14, and another input is received from the Peak Amplitude Detector 24. Thus, it is only after the end of the scan of Memory 13 and at the instant when the 60-cycle source is at peak amplitude that Holding Register 23 assumes those conditions on its various stages which are at the precise instant representative of the input parameters, and the Holding Register then holds these conditions throughout the complete memory scan and until the beginning of the next scan. Consequently, the computations made by the apparatus of the invention are all dependent upon the particular conditions of the Computer Inputs 10 which they assume at a fixed instant of time preparatory to beginning a complete scan and are not subject to random change during a scan.

The Memory 13 will subsequently be described in greater detail. For the present, it is sufficient to recognize that the memory is essentially a storage unit wherein there are stored a plurality of words each comprising a specific address and instruction. In a typical embodiment of the invention, the memory 13 contains 4,096 words each comprising 12 binary digits, with three of the bits of each word being used to designate a specific instruction for the Central Processor Unit (CPU) 12 and the remaining nine bits designating a particular address, i.e. a specific input or output register. As previously stated, the Scanner 14 comprises essentially a ring-type counter, and the output of the Scanner is applied to the ROM 13 so as to scan each word in the memory, one word at a time, starting with the word zero and proceeding in order through the word 7777 which represents, in the octal number system, the last or 4,096th word in the memory, starting thereafter again with the 0 or first word, and so on.

As shown in FIG. 2, the address portion of each scanned word is applied both to Multiplexer 25, which may be of the type described in FIG. 13–39 of "Pulse and Digital Circuits", pages 423–24, 1956, and to AND gate 26. The purpose in applying the address portion of each word to the Multiplexer 25 is to make it possible to select a particular stage of the Multiplexer 25 which is to be operatively connected to AND gate 27 and thus to the Input-Output Bus 28. As an example, assume that normally-closed contact 29 in the Computer Inputs 10 is associated with step No. 3 of the Input Converter 22 and thus also with stage 3 of Holding Register 23, and with stage 3 of Multiplexer 25. If the address portion of a particular scanned word is intended to refer to this particular input, then the multi-bit address code will, when decoded, select only this particular stage 3 of Multiplexer to be operationally connected to gate 27 and thence to Input-Output Bus 28. In other words, the purpose in applying the address portion of the memory word to Multiplexer 25 is to enable a designated one of the inputs to Multiplexer 25 to at that time be operatively connected to the Input-Output Bus while all other inputs and all output registers are at that time disconnected from the Input-Output Bus.

The instruction portion of each scanned word is applied to Decoder 29. According to the permutations of 1s and 0s in the three-bit instruction code, a selected one of the eight output leads from the Decoder 29 is energized upon each scanned word of ROM 13. THe first six of these output leads 30–35 are connected to Logic Unit 38, and the particular one of these leads 30–35 which is selected determines which of the six data processing functions of Logic Unit 38 is to be effective in response to the respective memory word. For example, if lead 30 is selected by Decoder 29, the AND function of Logic Unit 38 will be effective; similarly, if the scanned word of ROM 13 results in the selection of lead 34 by Decoder 29, the LDA (load accumulator) function of logic unit 38 will then be effective.

From the preceding description, it can be seen that a particular word in ROM 13 may have an address portion which causes a particular data bit corresponding to a selected one of the Computer Inputs 10 to appear on Input-Output Bus 28 and that, concurrently, the instruction part of that same word may enable a respective one of the data processing functions of Logic Unit 38. As a specific example, a particular word in ROM 13 when scanned will result in the appearance of a particular 0 or 1 data bit on Bus 28 as a consequence of the fact that, at the beginning of the scanning cycle, front contact 29 of the Computer Inputs 10 was closed. If it is further assumed that the instruction part of the same scanned word corresponds to the LDA function, resulting in the selection of lead 34 by Decoder 29, then the Logic Unit 38 will cause that particular data bit then on Bus 28 to be applied as an input to OR gate 40. Since only the LDA function of Logic Unit 38 will now be effective, with all other functions of the Logic Unit at this time being ineffective, only this single input to OR gate 40 will appear at this time so that a corresponding data bit is then applied as an enabling input to both Accumulator 42 and to the X Flip-Flop 44.

To continue with the preceding example, it will be assumed that the next succeeding word in ROM 13 has an address which results in the Input-Output Bus 28 being selectively energized or de-energized in dependence on the condition of pushbutton 46 in Computer Inputs 10. If it is assumed that the instruction part of this same word represents the AND function of Logic Unit 38, resulting from the selection of lead 30 from Decoder 29, then the particular data bit now appearing on the Input-Output Bus 28 will be AND'ed with the data now being held in accumulator 42 and being fed back to Logic Unit 38 via Bus 48. In a similar way, it can be appreciated by one skilled in the art that the Logic Unit 38 can selectively perform AND or OR functions, or the complement of each, and can also load into the accumulator any data bit appearing on the Input-Output Bus (LDA), or can load into the Accumulator 42 the complement of the data bit appearing on Input/Output bus 28 (LDA–C).

The computed result obtained by the Logic Unit 38 as described above is supplied as an input to OR gate 40; thus, the result of computation by any of the data processing portions of the Logic Unit 38 results in a single input to OR gate 40 and the application of an enabling input to Accumulator 42 and also to X Flip-Flop 44.

If any of the first six listed data handling portions of Logic Unit 38 is effective, then a single input is applied to the OR function logic 46, with the result that an enabling input is then applied over lead 48 to Accumulator 42. When so enabled, the Accumulator 42 is capable of responding to the computed output of the Logic Unit 38 which is supplied to it from the OR gate 40, whereas the X Flip-Flop is not so enabled and thus cannot respond to the output of Logic Unit 38.

In addition to the six computing functions described above and comprising the AND and OR and Load functions, together with their complements, two additional instructions may be provided by Decoder 29. The first of these is a "Store" command which may be selectively caused to appear on bus 50 and be connected as an enabling input to the Store AND gate 52. When the Store command is provided, it enables the AND gate 52 to provide a signal to the Input/Output Bus 28 dependent upon the inputs then being received by the Store gate 52 from both the Accumulator 42 and the X Flip-Flop 44. Thus, if both the Accumulator 42 and the X Flip-Flop 44 are then storing a 1, then a 1 will be supplied to the Input/Output Bus 28; whereas, if either the Accumulator 42 or X Flip-Flop 44 is not storing a 1, then obviously a 0 will be supplied to the Input/Output Bus 28. Thus, the data stored in the Accumulator 42 is always ANDed with whatever is stored in the X Flip-Flop 44, and the reason for doing this will subsequently become clear when specific examples are given of the operation of the computer of this invention.

A further instruction which may be provided by the decoder is what has been termed "AUX 510" function referring to the fact that the address 510 is designated arbitrarily as the address for the X Flip-Flop 44. Thus, when it is desired to store a data bit in the X Flip-flop 44, it is only necessary to provide in ROM 13 a word having the address 510 and the instruction AUX. When this is done, the instruction part of the word will be decoded by the Decoder 29 so as to provide an appropriate signal on lead 54 which connects to an input of AND gate 26. At the same time, the AND gate 26 receives a plurality of inputs which are indicative of the address 510. More specifically, the address part of the code appearing on lead 56 appears in the form of a selective energization of nine address buses which are connected to Buffer 58. Connections are also made from these buses to AND gate 26, and the manner of making these connections, with the input to the AND gate 26 from the 1 address bus being negated, means that this AND gate 26 can only provide an output signal when the word read from the ROM 13 has the address 510 and the AUX instruction. When these conditions are met, an input is provided for AND gate 60 over lead 64 from AND gate 26. Concurrently, a strobe input over lead 62 from scanner 14 provides a second enabling input to AND gate 60. When both these inputs are received by AND gate 60, an enabling gate is applied to the X Flip-Flop 44. It will be noted that the enabling signal on lead 64 is also applied to Logic Unit 38 as an enabling input for the AUX 510 data processing portion of this unit. Being so enabled, the AUX 510 portion is capable of passing on to OR gate 40 the data bit then stored in Accumulator 42 and fed back as an input to Logic Unit 38 over lead 48. Of course, at such time the Accumulator 42 cannot be responsive to the computed output from Logic Unit 38 because it is not receiving an enabling input from the OR Function Logic 46.

When it is desired that any data bit appearing on the Input/Output Bus 28 is to be stored in an output register, this is accomplished by providing the Store command on lead 50 as previously described, which thereupon enables the Store and Gate 52 to provide a signal on the Input/Output Bus 28. The address which is associated with the Store command designates the particular one of the stages of the Temporary Storage Register 66 which is then to be rendered responsive. This function is accomplished by the Buffer 58 and Decoder 68. The Decoder 68 responds to the selective appearance of zeroes and ones on the plurality of buses carrying the WVHI bit address code and selecting the particular stage of the Temporary Storage Register 66 which is then to be responsive to the particular bit then appearing on the Input/Output Bus 28.

The various stages of the Temporary Storage Register 66 are continually responsive during a complete scanning cycle to the inputs that they receive from the Input/Output Bus 28 and are thus capable of changing their conditions throughout a complete memory scan. This is permissible with the controller of this invention since the various stages of the Holding Register 70 which acutally operate the Controlled Devices are not operated until the end of the complete scanning cycle. The Holding Register 70 maintains its various stages in the conditions to which they were operated at the completion of the last scan. It is not until a scan of the memory has been completed that the output Line Synch 21 provides an enabling input to Holding Register 70 over lead 76 to thereby permit its various stages to assume conditions corresponding to those of the associated respective stages of the Temporary Storage Register 66. As previously described in connection with FIG. 1, the Output Line Synch is so controlled that it provides an output pulse to Holding Register 70 only upon its detection of the zero crossing point of the waveform of the power source. Thus, the Output Line Synch 21 is controlled jointly by Scanner 14 which senses when a memory scan has been completed and also by the Zero Crossing Detector 72 which recognizes the instant of zero amplitude of the 60-cycle waveform. In this way, each stage of the Holding Register 70 is actuated at a time when there is least likelihood of generating transients which will adversely affect the processor.

The various stages of the Holding Register 70 control corresponding stages of Output Converter 74 which then in turn controls the various Controlled Devices 11. The function of the Output Converter 74, which may be of the type described in U. S. Pat. No. 3,663,950, is to respond to the low level of signal which is provided by the Holding Register 70 and to convert such signal to a voltage and power level which is suitable for the control of the various Controlled Devices 11.

DETAILED DESCRIPTION OF FIG. 3 – CENTRAL PROCESSING UNIT

Figure 3:
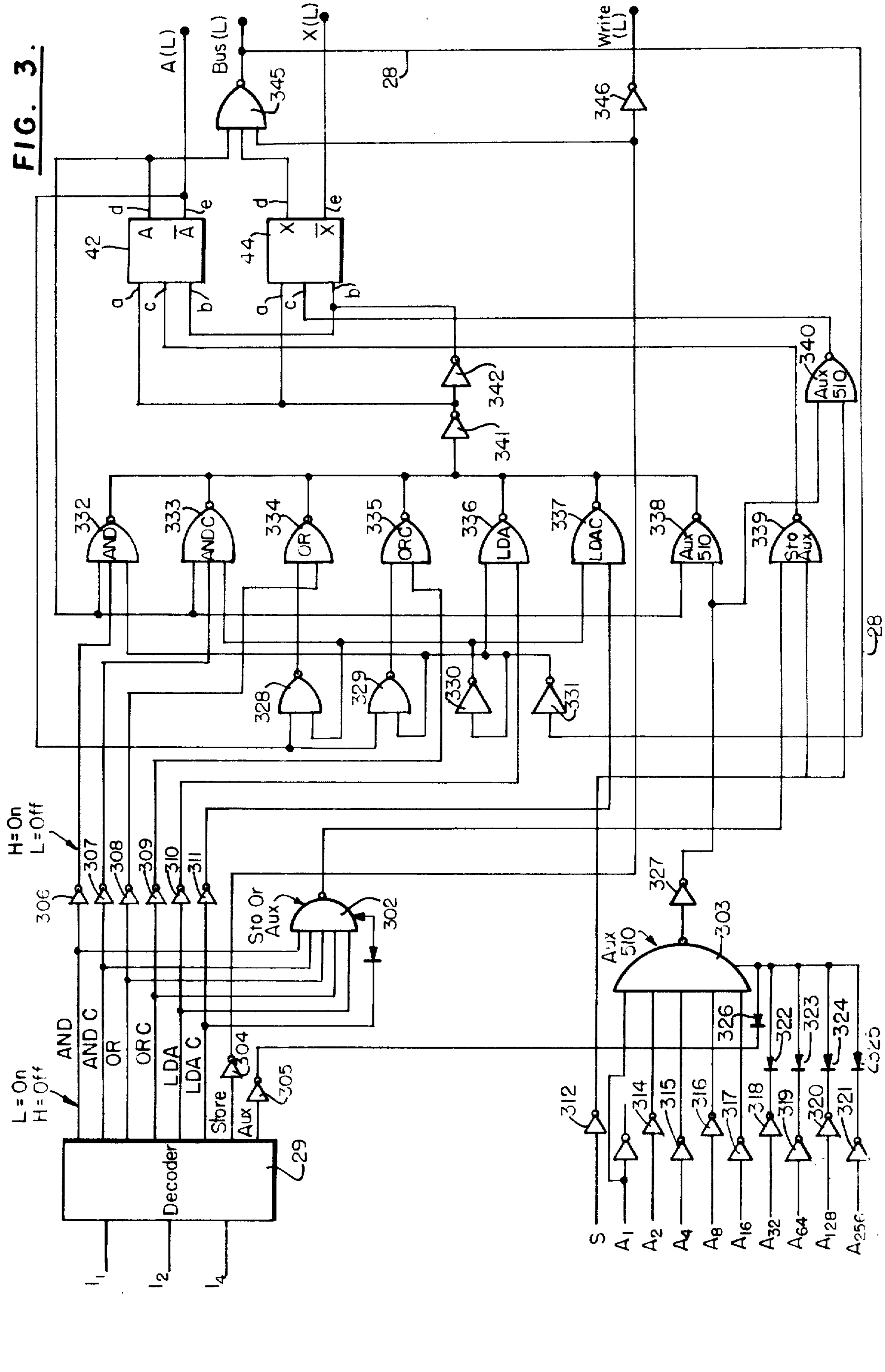
FIG. 3 is a circuit diagram of the central processing unit of the controller of this invention.

FIG. 3 illustrates the central processor unit, CPU 12, of the controller of this invention. This unit includes a plurality of NAND gates, inverters, two 1-bit registers, 42 and 44, and a Decoder 29. The instruction Decoder 29 accepts three inputs, $I_1$, $I_2$, and $I_4$, forming the three bit instruction portion of each word in the memory, and decodes the combination of signals on these three inputs to one of eight possible commands to which the CPU responds. The three input lines are connected to the Read Only Memory (ROM) 13 and transmit the instruction portion of each word read to the CPU for execution.

The Decoder 29 is provided with eight output lines, each corresponding to one of the instructions to which the CPU is capable of responding. They are, in order, (1) AND, (2) AND–C, (3) OR, (4) OR–C, (5) LDA, (6) LDA–C, (7) STO, and (8) AUX. These commands perform, respectively, the following functions: (1) AND the bit stored in the accumulator with the bit on the bus and place the result back in the accumulator, (2) AND the bit stored in the accumulator with the complement of the bit on the bus and store the result in the accumulator, (3) OR the bit stored in the accumulator with the bit on the bus and place the result in the accumulator, (4) OR the bit in the accumulator with the complement of the bit on the bus and place the result in the accumulator, (5) place the bit on the bus in the accumulator, (6) place the complement of the bit on the bus in the accumulator, (7) AND the bit in the accumulator with the bit in the X flip-flop 44, and store the result in a register indicated by the address portion of the instruction, (8) AUX is an auxiliary instruction which can be used for a variety of purposes, in the present embodiment is only used with the address 510 at which time the contents of the accumulator are transferred to the X register 44.

The first output line from Decoder 29, corresponding to the AND instruction, is connected as one input to the gate 302. In addition, through inverter 306 it is also connected to gate 332. The second line, corresponding to the AND-C instruction, is also connected as one input to gate 302 and, from inverter 307, is connected to gate 333. The third line, corresponding to the OR instruction, is also connected as one input to gate 302 and is, in turn, connected through inverter 308 to gate 334. The fourth line, corresponding to the OR-C instruction, is connected as one input to gate 302 and, through inverter 309, is connected to gate 335. The fifth line, corresponding to the LDA instruction, is connected as one input to gate 302 and, through inverter 310, is connected to gate 336. The sixth line, corresponding to the LDA–C instruction, provides one input to gate 302 and, through inverter 311, provides an input signal to gate 337. The seventh line, corresponding to the Store instruction, provides an input, through inverter 304 to gate 345 and inverter 346. The eighth line, corresponding to the AUX instruction, provides an input, through inverter 305 and diode 326 to gate 303.

The ROM 13, in addition to providing the three bits corresponding to the instruction portion of the word stored at any location, supplies nine bits corresponding to the particular address associated with that instruction. One location at which the address information is utilized is the CPU. Address bits $A_2$, $A_4$, $A_8$, and $A_{16}$ provide inputs to gate 303 through the respective inverters 314 through 317. Address bit $A_1$ provides a direct input to gate 303 and address bits $A_{32}$, $A_{64}$, $A_{128}$, and $A_{256}$ provide inputs to gate 303 through inverters 318–321 and diodes 322–325, respectively.

At the inputs of the CPU, $A_1$–$A_{256}$ appear in negative logic, that is, normally all the input lines are high and only when a particular line is selected does its voltage go low. For example, in negative logic, for the address 510, all inputs would be low except $A_1$. Inverters 314–321 invert the input signals $A_2$–$A_{256}$. Therefore, when the address 510 is read out of the ROM 13, the inputs to gate 303 from the respective input lines $A_2$–$A_{256}$ will all be high. In addition, the input $A_1$ will also be high, thus enabling gate 303 if the AUX instruction has been decoded through Decoder 29. This signal, inverted through inverter 305, is also connected as an input to gate 303. Thus, when, and only when, the word read out of ROM 13 corresponds to AUX 510 will gate 303 be enabled.

Each of the registers 42 and 44 is provided with three inputs and two outputs. Two of the inputs to each of the registers, *a* and *b*, provide push-pull inputs, that is due to inverter 342 and the input at *b* is the complement of the input at *a*. A third input, *c*, provides an inhibiting input, that is, an input signal at *c* will disable the register from responding to the inputs received at *a* and *b*. The output at *d* reflects the contents of the register and the output at $e$ reflects the complement of the contents of the register.

The AND signal from Decoder 29 provides one input to AND gate 332, through inverter 306. A second input to gate 332 is provided by the contents of register 42 through the $d$ output, and the third input to gate 332 is provided by the input/output bus 28. At this point it should be explained that the data on the input/output bus 28 exists in negative logic only and therefore to obtain the bus signal in positive logic it is necessary to process this signal through an inverter. Therefore, an input to gate 332 is provided by inverter 331.

One input to gate 333 is the AND–C signal applied through inverter 307 from Decoder 29. A second input to gate 333 is the contents of the register 42 provided through the $d$ output. The third input to gate 333 is the output of inverter 330 which is fed by inverter 331. The net result of the two inverters is transmission of the input/output bus signal, complemented. The OR gate 334 receives one of its inputs from gate 328. Gate 328 is provided, on one input, with the complement of the contents of register 42 through its $e$ output. The other input to gate 328 is provided by inverter 330 which, as is explained above, provides the complement of the input/output bus signal.

The OR–C gate 335 receives one input from gate 329. Gate 329 is provided with the complement of the contents of register 42 through its output $e$. The other input to gate 329 is provided by inverter 331. The output of gate 329 forms one input for gate 335 whose other input is the OR–C signal provided through inverter 309.

The LDA signal, through inverter 310, forms one input to gate 336. The other input to gate 336 is obtained from the output of inverter 331.

The LDA–C signal, through inverter 331, forms one input for gate 337. The other input to gate 337 is provided by inverter 330.

One input to gate 338 is provided by inverter 327 which is fed by gate 303. The second input to gate 338 is the contents of the register 42 provided through its $d$ output.

One input to gate 339 is the output of gate 302, and the remaining input to gate 339 is a strobe signal provided from the scanner 14 through inverter 312.

An input to gate 340 is the output of inverter 327 which is fed by gate 303. The other input to gate 340 is the same strobe signal from the inverter 312.

Gates 332–338 have their outputs tied in common to inverter 341. Inverter 341 provides the $a$ input signal for registers 42 and 44. Inverter 342, which is fed by inverter 341, provides the $b$ input to registers 42 and 44. Gate 339 provides the $c$ input for register 42 and gate 340 provides the $c$ input for register 44. Gate 345 is fed, along with the Store signal through inverter 304, with the $d$ outputs of registers 42 and 44. The output of gate 345 provides the input/output bus signal in negative logic. Also provided at the outputs of the CPU are the complement of the contents of register 42 and the complement of the contents of register 44 through their respective $e$ outputs. The output of inverter 346 also provides a "write" signal in negative logic.

Register 42 forms the accumulator of the CPU in that, during a computation, the subtotal is stored therein. Register 42 comprises a flip-flop which provides ample storage for the single bit computational output which is the maximum amount of data provided on any word of the memory scan. In a similar manner, register 44 is also a flip-flop which provides adequate storage for the single bit which will be required to be placed there.

Before describing the various operations of the CPU, it should be noted that the same input signals are provided both registers 42 and 44 on their $a$ and $b$ inputs. The inhibit input signal, $c$, is provided to differentiate between those signals which are required to be stored in the accumulator and those signals which are required to be stored in the X register, 44. Any of the first six instructions, that is, AND, AND–C, OR, OR–C, LDA, or LDA–C require the outputs of inverters 341 and 342 to be stored in the accumulator and not to be stored in the X register, 44. If any of these six signals are present, the gate 302 will not be enabled, providing a high output to gate 339 which will provide a low input to the $c$ input of accumulator 42. Thus, if any of the six input signals are present, the accumulator 42 will not be inhibited and it will accept any signal presented to it. At the same time, gate 303 will not be enabled. This is true since this gate will only be enabled in response to an AUX 510 instruction. Therefore, the output of this gate will be high, the output of inverter 327 will be low, and the output of gate 340 will be high, thus inhibiting the X register 44. Therefore, regardless of the signals provided by inverters 341 and 342 during an AND, AND–C, OR, OR–C, LDA, and LDA–C instruction the X register 44 will not respond. The only time the $c$ input of register 44 will be low is when an AUX 510 instruction is presented driving the output of gate 303 low providing a high input out of inverter 327 and a corresponding low output from gate 340. If the instruction is a Store or an AUX instruction, gate 302 will provide a low input to gate 339 which will provide a high input to accumulator 42 thus inhibiting it from responding to any signals on inverters 341 and 342. Thus, during these two, Store or AUX, instructions the accumulator, register 42, will not respond to input signals. A correlary of this operation is that during a Store instruction, when a data bit is written into an output register, the accumulator remains unchanged and therefore its contents can be used in a subsequent operation. The strobe input, $s$, through inverter 312 provides one of the high inputs necessary to either gate 339 or gate 340 to allow one of the registers 42 or 44 to respond to input signals. Therefore, only during the occurrence of the strobe signal can data be written into registers 42 or 44.

Of the different operations performed by the CPU, the most straight forward and easiest to understand are the AND, AND–C, LDA, and LDA–C instructions. Each of these operations is performed, in essence, by a single separate gate. The gate 332 performs the AND function, gate 333 performs the AND–C function, gate 336 provides the LDA or load function, and gate 337 provides the LDA–C function, i.e., loading the complement of the data on the bus into accumulator 42. In each case, the decoded instruction signal from Decoder 29 is fed to the respective gate. Another input to these gates is the input/output bus signal or its complement depending upon whether or not the gate is providing a complement function. The bus signal which occurs in negative logic is provided in positive logic by inverter 331, and the complement of the bus signal is provided by inverter 330. The AND gate 332 receives the decoded AND signal as one input, it receives the $d$ output of the register 42 as another input, and it also receives the signal on the input/output bus, in positive logic. If an AND signal is present, gate 332 provides a low output if the input/output is high and if the accumulator had stored a 1. This low output, inverted by inverter 341, is provided as an input to the register 42. At this time, the *c* input to the register 42 would be low as explained above and a 1 would be written back into register 42. If either the signal on the input/output bus were low or the register had previously stored a 0, a 0 would be rewritten back into the register. Thus it can be seen that the central processing unit has performed an AND function on the data previously stored in accumulator 42 with the data on the input/output bus.

The AND-C gate 333 performs the same function, the only difference being that its input is from inverter 330 providing the complement of the bus signal. Therefore a 1 will be rewritten into accumulator 42 if the contents previously stored therein were high and the signal on the input/output bus were low. This is obviously an AND function between the accumulator contents and the complement of the signal on the bus.

Gate 336, when enabled by a LDA, or load instruction, will place in the accumulator the signal on the input/output bus through inverter 331. If the signal on the input/output bus were high, a 1 would be written into the accumulator. Correspondingly, if the signal on the input/output bus were low, a 0 would be written into the accumulator. The previous contents of the accumulator are immaterial to this operation. In a like manner, the gate 337 performs a load complement or LDA-C instruction. When energized by this instruction signal, it will place in the accumulator 42 the complement of the signal on the input/output bus. In order to perform this function, its input is from inverter 330 which provides gate 337 with a signal corresponding to the complement of the signal on the input/output bus. As has been mentioned previously, if any of these four input instructions are present, the *c* input to the accumulator will be low during the occurrence of the strobe signal from scanner 14, thus allowing the accumulator 42 to respond to the outputs of inverters 341 and 342 at the proper time.

The OR and OR-C functions are provided using only NAND gates. The OR function is provided by gates 328 and 334 and the OR-C function is provided by gates 329 and 335. Gates 328 and 329 both receive, as one input signal, a signal representing the contents of the accumulator 42. Gate 328 receives as its other input signal the complement of the contents of the bus and gate 329 receives as its other input signal the bus signal. A truth table for the function A OR B (where A indicates the contents of the accumulator and B indicates the bus signal on the bus) is reproduced below.

| | A | |
|---|---|---|
| B | 1 | 0 |
| 1 | 1 | 1 |
| 0 | 1 | 0 |

Thus, if either the accumulator is storing a 1 or the bus has a 1 thereon, the function A OR B will produce a 1. If, and only if, both the accumulator and the bus have a 0 will a 0 be the result of the function A or B. To determine whether or not the combination of gates 328 and 334 provide the OR function as shown in the table above, it is necessary to examine the condition which will produce a 0 input to the accumulator 42, assuming an OR instruction is present. This condition should only occur if the original contents of the accumulator 42 is 0 and the signal on the bus were also 0. A low input at accumulator 42 is generated by a high input to inverter 341 which can only occur, assuming an OR instruction present, if the other input to gate 334 is low. This corresponds to gate 328 being enabled. Since gate 328 is provided with a signal corresponding to the complement of the accumulator contents and also a signal corresponding to the complement of the bus signal, this gate will be enabled, that is, both its inputs will be high when the accumulator is storing a 0 and the bus signal is a 0. Under these circumstances, the complement of the accumulator contents will be a 1 and the complement of the bus signal will be a 1, enabling gate 328. So a low output is provided the accumulator 42 when both the accumulator and the bus signal are 0. This checks with the truth table above. For any other condition, that is, if the accumulator had a 1 therein or the bus signal is high, the gate 328 would not be enabled and therefore would produce a high output signal which would cause a 1 input to the accumulator 42. The foregoing demonstrates that the combination of gates 328 and 334 do in fact mechanize the OR truth table reproduced above.

Gates 329 and 335 perform an OR-C function, that is, they combine the contents of the accumulator and the complement of the contents of the bus to produce the result A OR $\bar{B}$. The truth table for this function would be the same as the one reproduced above, substituting $\bar{B}$ for B. Now let us see if the combination of gates 329 and 335 will produce this function, assuming the instruction OR-C is present. Examining the truth table we determine that the only time a 0 will be produced by this function is when the accumulator contents are 0 and the bus complement is 0, corresponding to a 1 on the bus. Under these circumstances, gate 329 will be enabled. If accumulator contents are 0, then the complement of that will be a 1. The other input to gate 329 is the bus signal in true form. That signal will also be high when a 1 is on the bus. Therefore, the output of gate 329 will be low providing a high output from gate 335 which provides a low input to the accumulator 42 through inverter 341. Therefore, the first condition of our truth table is verified. When the accumulator has a 0 and the complement of the bus is a 0, the combination of gates 329 and 335 will also produce a 0. If either of these conditions is changed, if the accumulator stores a 1 or the bus signal is a 0 gate 329 will not be enabled producing a high output as an input to gate 335 which will cause a 1 to be presented to the accumulator 42. This verifies the remaining three possibilities and the entire truth table is verified.

In order for the computed result to be effective, it must be transferred from the CPU to one of the output registers by the input/output bus. The only path to this bus from the CPU is through the gate 345. As has been explained above, one of the inputs to gate 345 is the Store signal from Decoder 29 via inverter 304. The other two inputs are provided by the contents of register 42 and 44. It will thus be noted that before any information is transferred via gate 345, the function A AND X (where X stands for the contents of register 44) is performed. Clearly then, it must be possible to place data into register 44 for the organization depicted in FIG. 3 to be effective at all. If register 44 contains, at all times, a 0, then no 1's will ever be written out of the CPU regardless of the contents of the accumulator 42. Prior to describing the Store instruction, we will now illustrate how data may be written into the X register 44.

The eighth instruction, AUX, is provided via inverter 305 to gate 303. Gate 303 is also provided with inputs from the address bits read out from the ROM 13. If the instruction read out of ROM 13 corresponds to AUX 510, then gate 303 will be enabled, as discussed above, providing a high input to gate 338. The other input to gate 338 comes from the accumulator 42 in its true form. Therefore, if a 1 had been stored in the accumulator, when an AUX 510 instruction is received, a high input will be provided to both registers 42 and 44 by inverter 341. As has been discussed above, if none of the instructions AND, AND–C, OR, OR–C, LDA, or LDA–C is present, the accumulator 42 will be inhibited from responding to input signals via gate 339. It has also been shown above that when the AUX 510 instruction is read, gate 340 provides a low input to the *c* input of register 44 and thus enables it to respond to input signals. Therefore, during an AUX 510 execution, a 1 will be written into the register 44 if a 1 was stored in accumulator 42. Correspondingly, a 0 will be written into register 44 if a 0 had been stored in accumulator 42. By reason of the action of gate 339 inhibiting the inputs to register 42, the contents of this register will remain unchanged.

Now that the method of writing into register 44 has been described, the operation of the Store instruction will also be described. When a Store instruction is received gate 302 will be enabled, providing a low output signal to gate 339 inasmuch as none of the signals AND, AND–C, OR, OR–C, LDA, or LDA–C will be present. The low input to gate 339 provides a high input to accumulator 42 thus inhibiting it from receiving any further signals. The contents of accumulator 42 will thus remain unchanged. In addition, inasmuch as the instruction AUX 510 is not present, the output of gate 303 will be high, providing a low input to gates 340 which will provide a high input to X register 44 thus inhibiting this register from changing its contents. The Store signal is also provided to gate 345 as one input thereof. The other two inputs are received from accumulator 42 and register 44, in true form. Therefore, if both registers are storing a 1, gate 345 will be enabled providing a low output signal which will be placed on the input/output bus. Inasmuch as the bus is in negative logic or complement form, the 0 indicates a 1. The same memory location at which the instruction Store was located will also contain an address. This address, when decoded, will select a particular output register which will receive the signal on the bus. Thus, as has been stated above, whenever a Store instruction is written, an unprogrammed A AND X instruction is performed.

DETAILED DESCRIPTION OF THE READ ONLY MEMORY

The read only memory comprises an interchangable printed circuit card with a matrix diode array as shown in FIG. 4. The memory provides a maximum of 4,096 words, each with 12 bits. The words are subdivided into two portions, an instruction portion with 3 bits, and an address portion with 9 bits. The scanner unit 14 sequentially interrogates the memory and the instruction and address portions of the word stored at each location are read out in turn. The memory word inputs, at the left, 0–7777, is intended to illustrate the input to the memory from the scanner. A DC potential is applied to the vertically oriented wires through appropriate resistances. The vertically oriented wires are selectively interconnected to the horizontally oriented wires by a diode-fuse combination. As orginally supplied, a diode-fuse combination is located at each intersection-qof the array. The memory is written into by selectively open circuiting the fuse-diode combinations at selected locations. Of course, once a fuse-diode combination is open circuited, it cannot be replaced and therefore the only changes that can be made, once a word has been written in at a selected location, is to open circuit some or all of the remaining fuse-diode combinations in that particular location.

In the present invention, the scanner selects a memory location by driving the corresponding horizontal wire to ground. Whereas, previously, each of the vertically oriented wires exhibited a plus potential, corresponding to the power source, when a memory location is interrogated by grounding those vertically oriented wires where the fuse-diode combination is intact, will also be driven near ground while the remaining vertically oriented wires will remain at the power source potential. Thus, in the example shown in FIG. 3, when memory location 0 is interrogated, the ROM output will be in the configuration 011101100111, where a 1 indicates a high potential and a 0 a low potential. In the controller of the instant invention, the memory read out is considered to be in negative logic and therefore the positive logic equivalent of the foregoing configuration would 100010011000. When broken down into its instructions and address portions, this corresponds to an instruction of 100, or an octal 4 corresponding to a load (LDA). The address portion of this instruction corresponds to 01001100 or octal 230 (decimal 152). In a like manner, memory location 1 contains the instruction 000 which corresponds to the AND instruction. The address portion of this memory location reads 001010000 corresponding to address 120 (octal). The next memory location has the instruction corresponding to 110000000100. Interpreted, the instruction portion of this word is an octal 6, corresponding to a Store instruction the address portion of this instruction word is a 4. Therefore, the first three memory locations contain the following program.

LDA 230
AND 120
STO 4

The fourth memory location, memory word number 3, contains a series of 1's. This corresponds to the instruction AUX and the memory location 511. This is a no operation instruction inasmuch as CPU will not respond to it. Thus, it is possible to leave unwritten memory locations for additional expansion at a later time. These locations will cause no operation of the controller and the machine will go on to the next memory location in order. Thus, if a program does not fill a ROM unit, the remaining memory locations can be left untouched and the controller will proceed through them causing no operation.

Mention has already been made of the fact that it is usually not possible to rewrite in this memory once date has been inserted at a particular memory location. However, it is possible to open circuit the remaining diode-fuse combinations for that memory location. Thus, in case of an error in writing or in a situation where it is desired to expand a previous instruction repertoire, it is only necessary to open circuit the remaining diode-fuse combinations in any memory location. This will result in an instruction of 000, interpreted as an AND instruction, coupled with the address 0. Location 0 is permanently wired to the power source so that this operation corresponds to an AND 1. Those skilled in the art will readily understand that ANDing anything with a 1 will result in what had previously been present and therefore this is another type of "no instruction" operation.

DETAILED DESCRIPTION OF FIG. 5

Now that the structure of the controller has been described in detail and the operation of its component parts has also been described, a few examples will show the manner in which control problems can be solved using the controller of the instant invention. FIG. 5 illustrates a simple, but convenient control problem that can be solved using the controller of the instant invention. The reference characters A through G represent normally open switches which are connected as inputs to the controller of the instant invention. The problem is for the controller to properly energize loads J, K, and L, or any of them, when the input conditions A through G are proper for that particular load or loads to be energized. For instance, if inputs A, B, and D are closed, load J should be energized or if inputs A, C, and D are closed, load J should also be energized.

A program for performing this operation is illustrated in FIG. 6. This is not the most effective program to solve this particular control problem but it is one which illustrates some of the features of the controller described in the instant application. For the following description, we will assume that the reference characters A through G are identified and connected to numerical input register locations and the loads J, K. and L are identified and connected to particular output registers. Once the program such as that shown in FIG. 6 has been written, it is only necessary to selectively open particular diode-fuse combinations on the ROM, as discussed with respect to FIG. 4, to reflect this particular program. The program is written in machine code in the second column of FIG. 6 except for the alphabetic designations A–L. It should be understood that these would be substituted with numeric identifications related to the registers the particular inputs or outputs denoted by the letters A–L are connected to.

The first two instructions are merely to place the condition of the master switch A into the X register 44. This is done inasmuch as the condition of this switch controls the entire control problem. If a particular control set up has a number of switches of the type represented by the switch A, different instructions, similar to the first two instructions shown in Figure, could be inserted at appropriate locations in the program to load the X register 44 with the appropriate data.

The next three instructions, 3–5, compute the control problem to determine whether the load J should or should not be energized. In particular, the condition of the switch B is loaded into the accumulator, register 42, by the third instruction. The fourth instruction is an OR function, combining the state of the switch B with the state of the switch C and placing the result in the accumulator register 42. The fifth instruction ANDs the subtotal with the condition of the switch D and places the final total in the accumulator register 42. This sixth instruction transfers the computed result out to the output register associated with load J. Instruction seven then begins to compute the control problems associated with loads K and L.

The particular program shown in FIG. 6 illustrates a significant feature of the controller of the instant invention when using the type of memory illustrated in FIG. 4. The reader will note that the instruction 10 performs the AND function with the input conditions for inputs E and M. It will be apparent that there is no input M associated with the logic problem shown in FIG. 5. As a consequence the instruction number 11, Store K will certainly be erroneous. Either there is no input M or the input M should have no effect on the load K. These two instructions merely illustrate that, using the present invention, if an incorrect program is written into a memory card, it is not necessary to discard that card. Inasmuch as the output loads are only activated once a complete memory scan has occurred, loading the K register with incorrect data will not have any effect until a complete memory scan has beenmade. Therefore, to correct this error, it is only necessary to rewrite, in succeeding memory locations, the correct program for computing the result to be placed in the K register.

Instructions 12 through 14 properly compute the result for the K register. Therefore, although incorrect data will be written into the K register by instruction 11, subsequent instruction 14 will correct this result.

Various modifications may be made to the controller of this invention to fulfill specific requirements. As one example, it is to be expected that any specific application of the controller will use less than the full capacity of the read-only memory. Where this occurs, it is possible to have the scanner 14 simply scan through the remaining unused memory words, thereby returning eventually to word zero again of the memory so as to start a new memory scan. However, it is also possible to operatively connect the word of the memory which immediately follows the last-used memory word to provide a re-setting input to scanner 14 which will force the scanner 14 back to the beginning of its count so that a new scan of the memory 13 will be initiated. Such a re-set of connection is shown diagrammatically in FIG. 2 by the dotted line connection 63.

The detailed description of the invention presented herein has described only a single auxiliary function, the AUX 510 function. Other auxiliary functions can be added by simply providing an additional gate for each such desired auxiliary function. It is thus possible, for example, to provide an AUX 509 function, in response to which an operative connection is then made from the computer appratus shown in block form in FIG. 2 to auxiliary computing apparatus such as an exclusive OR, or to external timer, shift register, etc.

What is to be claimed is:

1. A process control computer which is continuously responsive to a plurality of variable input parameters and continuously controls in accordance with such input parameters a plurality of output devices in combination, a plurality of registers, a read-only memory for storing a plurality of words each comprising an address and an instruction,
means for continuously and repetitively scanning one at a time all the words stored in said memory,
central processing means,
a data input/output bus connected both to the input and output of said central processing means,
first means responsive to the address portion of each scanned word in said memory for operatively connecting any one of said registers to said input/output bus,
second means responsive to the instruction portion of each word scanned by said scanning means for selectively either enabling said central processing means to receive data from said input/output bus or to enable said input/output bus to receive data from said central processing means,
and means connecting some of said registers to be responsive to said input parameters and for connecting others of said registers to said output devices.

2. The combination of claim 1 in which each of said registers which are connected to said output devices comprises a temporary storage register which is at any time responsive to data on said input/output bus subject only to its being selected by said first means in accordance with the address portion of a scanned memory word and also comprises a holding register whose condition continually governs the operated condition of the associated controlling device,
and means for controlling said holding register to a condition in accordance with that of the respective temporary storage register only upon the completion of a scan of all the words in said read-only memory.

3. The combination of claim 2 which further includes a source of power at a predetermined frequency for operating said controlled devices,
said register controlling means being responsive both to said power source and to said scanning means for controlling each holding register to a condition in accordance with that of the respective temporary storage register only when both the scan of the memory has been completed and the waveform of the voltage of said power source is substantially at zero amplitude.

4. The combination of claim 1 in which said read-only memory comprises a matrix of row and column buses, each bit of each memory word being represented by the selective interconnection between a pair of said buses, a fused diode providing each such selective interconnection.

5. The combination of claim 1 in which said central processing means comprises first and second accumulator registers, logic means responsive to each memory word for forming a predetermined logic function with the data then stored in a first of said accumulator registers and data on said input/output bus,
said logic means being further responsive to a predetermined instruction in a scanned memory word for leading data into either of said accumulator registers, and AND gate means receiving inputs from both said accumulator registers for at times placing data on said input/output bus.

6. The combination of claim 1 which includes a power source of a predetermined frequency for energizing said controlled devices, said registers which are connected to be responsive to said input parameters being responsive both to said first means and to said power source and also to said scanning means,
each said last-named register being responsive to the occurrence of a peak in the amplitude of the waveform of voltage of said power source occurring prior to the beginning of each scan of said memory for controlling such register to be operated in accordance with the respective input parameter.

7. A process control computer which is continuously responsive to a plurality of variable input parameters and continuously controls, in accordance with such input parameters, a plurality of output devices comprising in combination,
a plurality of input registers, and a plurality of output registers,
a read-only memory for storing a plurality of words each comprising an address and an instruction,
means for continuously and repetitively scanning one at a time all the words stored in said memory,
and central processing means, including,
a single bit accumulator register,
first means responsive to the address portion of each scanned word in said memory,
second means responsive to the instruction portion of each scanned word in said memory,
first logic means, responsive to said second means, for placing in said accumulator a data bit from a particular input or output register as selected by said first means,
second logic means, responsive to said second means, for performing a predetermined logic function with the single data bit then in said accumulator and the data then stored in a particular input or output register as selected by said first means,
third logic means, responsive to said second means, for controlling a particular output register, as selected by said first means, in accordance with the data bit then stored in said accumulator.

8. The apparatus of claim 7 in which said central processing means includes a second single-bit data storage register and means, responsive to said first and second means, for placing in said storage register a data bit representative of a particular input condition, and AND logic means responsive to both said accumulator and said storage register for controlling an output register.

9. The combination of claim 8 which further includes an input/output bus and multiplexer means controlled by said second means for, at times, operatively connecting a particular input register to said bus.

10. The apparatus of claim 9 in which the output of said accumulator is, at times, in response to said second means, connected to said bus and via said bus to a particular output register selected by said first means.

* * * * *